J. BAKER.
DETACHABLE SECURING MEANS FOR TIRES.
APPLICATION FILED FEB. 14, 1907.
913,252.
Patented Feb. 23, 1909.
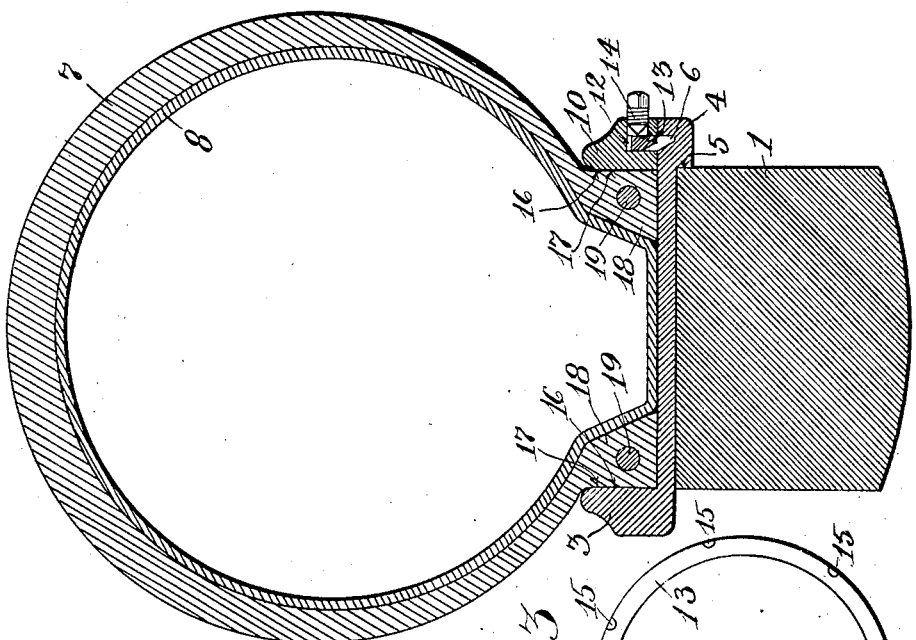
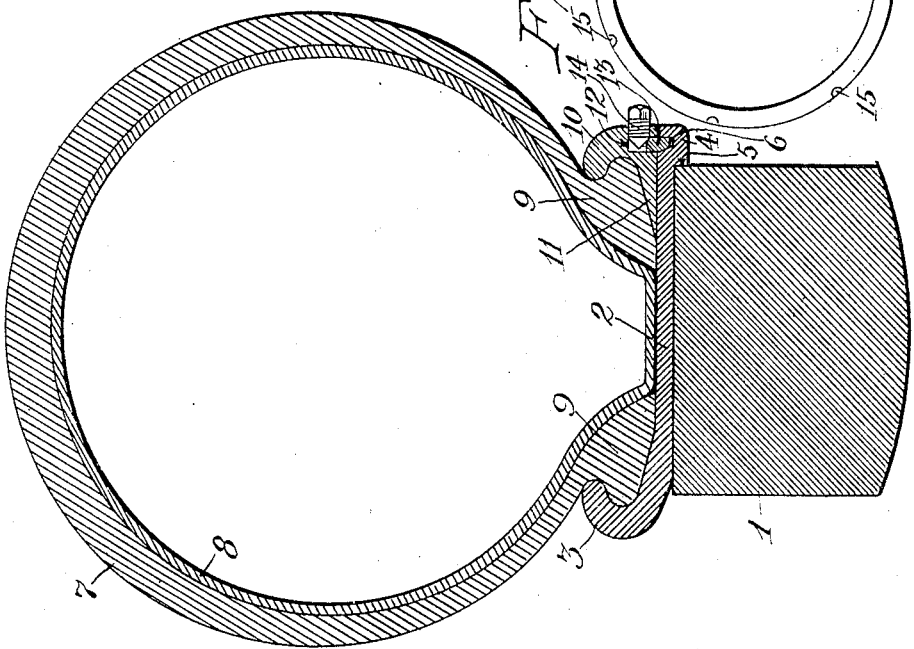
WITNESSES:
Louis W. Gratz.
Frank L. A. Graham
INVENTOR
John Baker
BY
Townsend, Bryant, Hackley & Knight
ATTORNEYS

UNITED STATES PATENT OFFICE.

JOHN BAKER, OF PASADENA, CALIFORNIA.

DETACHABLE SECURING MEANS FOR TIRES.

No. 913,252.

Specification of Letters Patent.

Patented Feb. 23, 1909.

Application filed February 14, 1907. Serial No. 357,413.

*To all whom it may concern:*

Be it known that I, JOHN BAKER, a citizen of the United States, residing at Pasadena, in the county of Los Angeles and State of California, have invented new and useful Detachable Securing Means for Tires, of which the following is a specification.

This invention relates to means for detachably securing tires to vehicle wheels, being particularly adapted for the attachment of pneumatic or cushion tires, and the main object of the invention is to provide a detachable fastening means which is extremely simple in construction, of economical manufacture and which, while positively locking the tire in position, and preventing accidental displacement of the tire, allows the ready removal of the tire when desired.

The accompanying drawings illustrate the invention and referring thereto:—Figure 1 is a cross section through a rim and tire equipped with one form of the invention. Fig. 2 is a similar view, showing a slightly modified form of construction adapted for a different tire. Fig. 3 is a plan view of the locking ring employed with both forms.

1 designates the felly of the wheel to which is secured, in any suitable manner, a rim 2, formed preferably of metal, and having a retaining flange 3 formed on one edge thereof. The other edge of the rim 2 is provided with an enlargement 4 having a shoulder 5 which abuts against the edge of the felly 1, the enlargement 4 also having an annular groove 6 the inner wall of which is inclined as shown in Fig. 1, while its outer wall is perpendicular to the upper face of the rim 2.

7 designates the outer shoe of the tire and
8 designates the removable inner air tube. The shoe 7 is provided with enlarged locking flanges 9, of well known form, one of which interlocks with the retaining flange 3, while the other locking flange 9 interlocks with a detachable retaining ring 10, the latter having a broad flange 11 wedged-shaped in cross section, with its flat lower face resting upon the outer flat face of the rim 2, the outer inclined face of the flange 11 forming a seat for the locking flange 9 of the tire. The retaining ring 10 is provided with an annular groove 12 which registers with the groove 6 in the rim when the retaining ring is in position for retaining the tire. A split locking ring is employed which normally lies partially within the groove 12 and partially in the groove 6, and the inner edge of the locking ring 13 is beveled, as clearly shown in Fig. 1, to fit the inclined wall of the groove 6. The retaining flange 10 at intervals is adapted to receive a series of locking screws 14, each locking screw having a conical end as shown, the ring being provided with a series of semi-conical concavities 15, the taper of which substantially corresponds to the taper of the conical ends of locking screws 14. The locking ring 13 has a natural tendency to spring open with its ends apart as shown in Fig. 3.

Normally the tire is held in place on the rim by the retaining flange 3 and retaining ring 10, the latter being positively locked from movement in either direction on the rim 2 by the locking ring 13, the latter being securely wedged into the groove 6 by the locking screws 14, which respectively engage their seats formed by the registering cavities 15. The locking ring when thus secured in position is contracted and has its ends closed together so that the two seats 15 adjacent the ends of the locking ring are spaced the proper distance apart to register with their related locking screws 14.

In order to remove the tire from the rim or to disengage one of the locking flanges 9 to permit access to the inner tube, the locking screws 14 are first retracted to withdraw their conical ends from their seats 15 in the locking ring, which allows the locking ring to expand and spring out into the groove 12 in the retaining ring 10 so that the locking ring 13 is entirely free from engagement with the groove 6 in the rim 2, whereupon the retaining ring 10 may be slipped off the rim 2, thus freeing the adjacent locking flange 9 of the tire and permitting access to flange 9 of the tire and permitting access to the inner tube, or allowing ready removal of the tire from the rim. In replacing the retaining ring 10, the locking ring 13 is expanded into the groove 12 so that its inner edge does not project below the inner flat face of the retaining ring which allows the latter to be slipped on over the edge of the rim 2 without the least difficulty. It will be noted that the locking ring 13 absolutely prevents movement of the retaining ring 10 in either direction on the rim 2 and that no dependence is placed upon the pressure of the tire or its locking flange 9 to hold the retaining ring 10 in position, thus the retaining ring 10 can not accidentally become loose even though the tire becomes punctured and relaxes.

Fig. 2 shows a slightly modified form in which the only difference is in the form of the retaining flange 3 and retaining ring 10, both flange 3 and retaining ring 10 having flat faces 16 which bear against corresponding flat faces 17 on the enlarged portions 18 of the tire, the latter having wires 19 extending therethrough.

What I claim is:—

1. A rim for vehicle wheels having a groove near one edge, a retaining ring on the rim and having a groove registering with the first named groove, a split locking ring lying within said grooves, and a series of locking screws for removably holding the locking ring in engagement with the groove in the rim.

2. In a vehicle wheel, a rim having an annular groove near its edge, one wall of the groove being beveled, a retaining ring on said rim and having a groove which registers with the groove in the rim, a split locking ring lying in both said grooves and having a beveled edge, and a series of locking screws with conical ends screwed in the retaining ring with their conical ends bearing against the locking ring and wedging the latter tightly in the groove in the rim.

3. A rim for vehicle wheels having a tire-retaining flange at one edge, the other edge having a groove, a retaining ring on the rim and having a groove registering with the first named groove, a split locking ring lying within said grooves, and a series of locking screws in said retaining ring for removably holding the locking ring in engagement with the groove of the rim, said locking ring having a series of semi-conical recesses forming seats for the ends of the locking screws, the latter having conical ends which act against said seats to wedge the locking ring into engagement in the groove in the rim.

4. A rim for vehicle wheels having a tire-retaining flange at one edge, the other edge having a groove, a retaining ring on the rim and having a groove registering with the first named groove, a split locking ring lying within said grooves, and a series of locking screws in said retaining ring for removably holding the locking ring in engagement with the groove in the rim, said rim having a shoulder which abuts against the edge of the felly of the wheel.

5. A rim for vehicle wheels having a tire-retaining flange at one edge, the other edge having a groove, a retaining ring on the rim and having a groove registering with the first named groove, a split locking ring lying within said grooves, and a series of locking screws in said retaining ring for removably holding the locking ring in engagement with the groove in the rim, the depth of the groove in said retaining ring being sufficient to fully receive the locking ring when the latter is allowed to expand thereinto by the retraction of the locking screws.

In testimony whereof, I have hereunto set my hand at Los Angeles California this 9th day of February 1907.

JOHN BAKER.

In presence of—
GEORGE T. HACKLEY,
FRANK L. A. GRAHAM.